United States Patent [19]

Burnop

[11] 4,295,981

[45] Oct. 20, 1981

[54] PRODUCTION OF OVERBASED MAGNESIUM DETERGENT ADDITIVES

[76] Inventor: Victor C. Burnop, Church Croft, West Challow, Wantage, Oxfordshire, England

[21] Appl. No.: 169,513

[22] Filed: Jul. 21, 1980

[30] Foreign Application Priority Data

Jul. 27, 1979 [GB] United Kingdom ............... 26211/79

[51] Int. Cl.$^3$ ...................... C10M 1/40; C10M 1/20; C10M 3/34; C10M 3/14
[52] U.S. Cl. .................................. 252/33.4; 252/42.7
[58] Field of Search ............................. 252/42.7, 33.4

[56] References Cited

U.S. PATENT DOCUMENTS

| | | | |
|---|---|---|---|
| 3,150,089 | 9/1964 | Hunt | 252/33 |
| 3,277,002 | 10/1966 | Hunt et al. | 252/32.7 |
| 3,718,589 | 2/1973 | Rogers et al. | 252/42.7 |
| 3,746,698 | 7/1973 | Hunt et al. | 260/137 |
| 3,755,170 | 8/1973 | Rogers et al. | 252/42.7 |
| 4,104,180 | 8/1978 | Burnop | 252/42.7 |

FOREIGN PATENT DOCUMENTS 1551819  9/1979  United Kingdom ............... 252/42.7

*Primary Examiner*—Delbert E. Gantz
*Assistant Examiner*—Irving Vaughn
*Attorney, Agent, or Firm*—Frank T. Johmann

[57] ABSTRACT

Highly basic magnesium phenates are prepared by a process in which a magnesium alkoxy-alkoxide is hydrolyzed in the presence of a sulphurized phenol and the mixture then carbonated in which the presence of free alkoxyalcohol in the reaction mixture is minimized prior to carbonation.

7 Claims, No Drawings

PRODUCTION OF OVERBASED MAGNESIUM DETERGENT ADDITIVES

This invention relates to a process for making detergent additives of high basicity suitable for use in lubricating oils.

There is an increasing need for detergent additives which have high basicity, and this invention is concerned with high basicity phenates commonly known as overbased phenates particularly overbased magnesium phenates. These compounds have been found to be particularly useful as additives in lubricating oils used in connection with high-sulphur fuels, such as marine diesel fuels, since the high basicity will neutralise the acids formed by the burning of the fuel.

The use of dispersed overbased alkaline earth metal compounds such as overbased alkaline earth metal phenates and sulphonates as additives in lubricating oils is known. It has been proposed to produce overbased alkaline earth metal carbonates by carbonating a mixture of a magnesium methanolate in the presence of a surfactant such as an alkyl phenol, that may be sulphurised, or an alkylaryl sulphonate. However, one problem associated with this process is that the magnesium methanolate is sparingly soluble in methanol. An alternative process using carbonated metal alkoxy-ethanol complexes as intermediates in the preparation of such overbased additives is known from U.S. Pat. Nos. 3,150,089, 3,277,002, 3,718,589, 3,746,698 and 3,755,170 where the dispersed alkaline earth metal is a carbonate. These patents all require the special formation of a carbonated complex of the general formula;

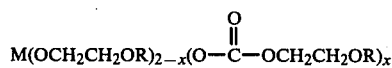

where M is an alkaline earth metal generally calcium or magnesium and x is between 0.5 and 1.5.

These earlier processess described above require the use of a volatile hydrocarbon solvent which, although not detrimental to product quality decreases the plant capacity and also required removal and recovery and separation of the solvent at the end of the reaction.

A problem associated with the production of overbased metal compounds is that of the viscosity of both the reaction mixture and the final product itself. The overbased materials consist of an alkaline earth metal compound, generally a carbonate, dispersed in the alkaline earth metal salt of the dispersing agents; the amount of dispersed alkaline earth metal being known as the overbasing amount. Generally these overbased materials are used as detergents in lubricating oils to react with acid residues formed in the oil thus, the greater the basicity of the material the better since this allows smaller amounts of the materials to be used for a given effect in a certain lubricating oil. However, to increase basicity it is necessary to increase the dispersed alkaline earth metal content which tends to increase the viscosity of the reaction mixture leading to processing problems. This problem is particularly marked if the alkaline earth metal is introduced in the form of the carbonated complex previously described and in order to overcome this problem it may be necessary to increase the amount of solvent used thus reducing reactor capacity and requiring solvent recovery.

The present invention relates to an improvement in the process of Belgian Pat. No. 842131 in which the viscosity of the magnesium phenate is reduced by reducing the amount of ethoxyethanol present in the reaction mixture during hydrolysis.

In our Belgian Pat. No. 842131 we describe a process which overcomes the problem of the previous process and does not require the formation of the metal complex.

The present invention therefore provides a process for the preparation of a colloidal suspension in oil of magnesium carbonate comprising:
(1) forming a reaction mixture comprising:
   (a) a non volatile diluent oil
   (b) magnesium alkoxyalkoxide as a solution in the alkoxyalcohol from which it is derived
   (c) one or more sulphurised phenols or metal phenates having one or more hydrocarbyl substituents, each substituent having not more than 60 carbon atoms or mixtures of such sulphurised phenols, which react with part of the magnesium alkoxyalkoxide to release an equivalent amount of free alkoxyalcohol.
(2) Adjusting the concentration of free alkoxyalcohol to be less than 5% of the reactor contents before hydrolysis.
(3) Adding at least one mole of water for every gram atom of magnesium present in excess of the amount of magnesium required to react with the sulphurised phenol and hydrolysing the magnesium alkoxyalkoxide.
(4) After hydrolysis introducing carbon dioxide into the reaction mixture whilst at a temperature not above 100° C.
(5) Removing volatiles from the reaction mixture.

Magnesium alkoxyalkoxide may be prepared in situ by reacting a metal oxide or hydroxide with an alkoxyalcohol such as ethoxy-ethanol. Alternatively the alkoxyalkoxide itself may be used as the starting material in which case we prefer to use a solution of the alkoxyalkoxide in the ether alcohol which is preferably ethoxyethanol. The alkoxyalkoxide may conveniently be prepared by dissolving magnesium metal in the alkoxyalcohol which is preferably ethoxyethanol since the magnesium ethoxyethoxide is readily soluble is ethoxyethanol.

The or each hydrocarbyl substituent in the hydrocarbylsubstituted phenol preferably has at least nine carbon atoms. Although the hydrocarbyl substituent can be an alkenyl, alkyl, aryl, aralkyl or alkarayl group, it is preferred that it should be an alkyl group and especially one containing 9 to 15 carbon atoms since compounds in which the alkyl group contains less than 9 carbon atoms have limited solubility in oil. Examples of suitable compounds include nonyl, decyl, dodecyl or tetradecyl phenol. Substituents which could be used include dodecenyl, tetradecenyl and aromatic substituents such as phenyl-ethyl and benzyl. Mixtures of alkyl-phenols include for example a mixture of nonyl-phenol and dodecyl-phenol.

It is preferred that the phenol be substituted with just one hydrocarbyl group, usually in the para position, but if desired there may be more than one hydrocarbyl substituent and mixtures of mono- and di-substituted phenols may be used. We prefer, however, to use phenols containing at least 90% by weight of monoalkyl-phenol.

The hydrocarbyl-substituted phenol may have another substituents e.g. halogens such as chlorine or bromine, nitro- or sulphonic acid groups.

We have also found that where the products are obtained from sulphurised alkylphenols the sulphur content of the starting material has a bearing on the viscosity of the product for a given TBN. For example, we prefer to use a nonyl-phenol sulphide oil mixture containing from 5.5% to 7.5% by weight of sulphur preferably a 70% nonyl-phenol sulphide 30% oil mixture to obtain a lubricant additive of TBN in the range 230 to 260.

When the surfactant is a sulphurised bridged phenol it will generally be of the general formula:

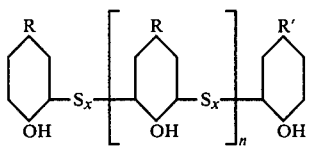

where x=1 or 2, n=0, 1 or 2.
where R and R₁ may be the same or different and may represent one or more alkyl groups. Sulphurised alkyl-phenols may be obtained as mixtures of derivatives based on mono- and di-alkyl-phenols or predominantly mono-alkyl and the process of the present invention is equally applicable to both types of sulphurised alkyl-phenol although we find the improved products are generally obtained when using the predominantly mono-alkyl-phenol. These sulphurised are obtained by reacting the substituted phenol with a sulphur chloride e.g. $SCl_2$, such sulphurised phenols having one or more hydrocarbyl groups as substituents, each substituent having not more than 60 carbon atoms. The preferred sulphurised phenols are of the formula set out above and have one hydrocarbyl group containing for example 9 to 15 carbons, per benzene ring, preferably the hydrocarbyl group is in the para position with respect to the hydroxyl group. There may be 1, 2, 3 or 4 sulphur atoms in the bridge linking the two phenyl groups, generally 1 to 2 generally sulphurised bridged phenols are mixtures and we prefer to use material containing an average from 1.5 to 1.7 sulphur atoms per pair of phenyl groups. We prefer that the sulphurised phenol contain from 7.5% to 11.0% by weight of sulphur.

A sulphonate or sulphonic acid may also be included in the reaction mixture to aid processing and improve the properties of the finished product. Examples of sulphonates that may be used include the traditional detergents such as $C_{18}$ to $C_{30}$ especially benzene-sulphonic acids or sulphonates and other long chain alkyl-substituted benzene-sulphonic acids, the so-called mahogany sulphonates obtained by extracting crude oil fractions with sulphuric acid may also be used.

The non-volatile diluent oil can be any diluent oil, such as paraffinic or naphthenic hydrocarbon oil, e.g. of mineral origin obtained by conventional refining. Alternatively synthetic lubricating oils, vegetable oils, animal oils or mixtures of such oils may be used. We find that oils which have viscosities of 15 to 30 cS at 100° F. are very suitable. As a further alternative one could use a lubricating oil of the kind described later in the specification.

In practice it is desirable to decide the relative amounts of magnesium alkoxyalkoxide and surfactant according to the TBN (total base number) desired for the overbased additive. The amount of ether alcohol in which the alkoxyalkoxide is dissolved is determined to some extent by the nature of the alcohol, and the amount of oil is governed by the requirement for a workable reaction medium of suitable viscosity as well as its amount in the final product, the finished product typically having about 60 wt % active ingredients.

In a typical reaction mixture for producing overbased phenates the amounts of reactants are as follows:

|  | Molar Proportion |
| --- | --- |
| Hydrocarbyl-substituted sulphurised phenol | 1 |
| Magnesium alkoxyalkoxide | 2-5 |
| Oil-about 35-40 wt % of total weight of finished product. |  |

We have found that if the amount of free alkoxyalcohol present during hydrolysis is minimised the viscosity of the final product is reduced. In addition the capacity of the reactor to produce magnesium phenate is increased due to the reduction of solvents present in the reactor. The quantity of free alkoxyalcohol may be reduced by maximising the magnesium content in the solution of the magnesium alkoxyalkoxide in the alkoxy alcohol and-/or by removing free alkoxyalcohol by stripping and this is preferred, since for instance solutions containing more than about 8.8% magnesium in ethoxyethanol tend to crystallise and cannot flow or be pumped.

After removal of the alkoxyalcohol water is then added, we prefer to use at least 1.4 moles of water for each metal atom of magnesium present in excess of the number of metal magnesium atoms required to react with the phenol. Most preferably we use about 3 gram molecules of water for each gram atom excess of magnesium as is claimed in our copending application No. 169,514. The reaction mixture is heated when the water is present to ensure hydrolysis of the magnesium alkoxyalkoxide preferably it is at a temperature in the range 50° C. to 70° C. We prefer to use a temperature of about 60° C. since if the temperature during hydrolysis is below about 50° C. the reaction mixture tends to become too viscous and can separate into two layers. If, however, the temperature rises above 70° C. the final product tends to be of high viscosity.

Once hydrolysis is complete carbon dioxide is passed through the product during which the temperature of the reaction mixture increases to about 100° C. but we prefer to ensure that the temperature does not rise above 100° C. since this tends to produce a product of high viscosity, and low carbonate content leading to inferior performance.

Finally, the volatiles consisting mainly of the ether-alcohol and a solvent if one is used are removed from the reaction mixture. This can be done by distillation and if necessary blowing with carbon dioxide or an inert gas such as nitrogen. It is preferable to keep the distillation temperature below 150° C. to avoid decomposition of the product which can result in unpleasant odours and if a relatively high boiling ether-alcohol has been used in the reaction whose removal is difficult without exceeding the decomposition temperature of the desired product, low pressure distillation may be used.

The preferred product is found to be a colloidal suspension in oil of basic magnesium compounds, mainly carbonate but including basic carbonate, oxide or hydroxide together with magnesium surfactants acting as dispersant and when the surfactant is phenol the advantage diameter of the colloidal particles generally is less than 60 A. Usually the finished product is 50-70%, e.g. 60% active ingredients in oil. Its TBN can vary from 150 to 400, usually 200-300, e.g. 240-260. We find that the process of the present invention allows a higher TBN product (around 250) to be obtained consistently without viscosity problems and without the need for a second solvent, although the use of one is not excluded.

The major organic constituents of the preferred magnesium metal sulphurised phenates obtained by our process have the structure:

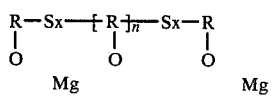

where M is magnesium, R is an alkylphenyl group. The final product can be a mixture of such phenates where x and n vary for different molecules and minor amounts of compounds in which more than two aromatic rings are joined by sulphur links may be present, however, generally n is 1 and/or 2 and x is 1 or 2 and possibly 3 or 4 with an average value of 1.5 to 2.

A minor amount of a sulphonate or a sulphonic acid may be added to the reaction mixture and we find that in some instances the presence of the sulphonate gives the final product improved solubility in highly viscous oils and also reduces the tendency of the product to form a skin on exposure to air.

The overbased detergent additives prepared by the process of this invention are very suitable for use in lubricating oils where their detergent properties inhibit formation of undesirable sediments whilst the high TBN of the product neutralises acids which may originate from fuel combustion thus reducing engine corrosion. The lubricating oils can be any animal, vegetable or any of the traditional mineral oils for example petroleum oil to SAE 30, 40 or 50 lubricating oil grades, castor oil, fish oils or oxidised mineral oil.

Alternatively the lubricating oil can be a synthetic ester lubricating oil and these include diesters such as di-octyl adipate, di-octyl sebacate, didecyl azelate, tridecyl adipate, didecyl succinate, didecyl glutarate and mixtures thereof. Alternatively the synthetic ester can be a polyester such as that prepared by reacting polyhydric alcohols such as trimethylolpropane and pentaerythritol with monocarboxylic acids such as butyric acid to give the corresponding tri- and tetra- esters. Also complex esters may be used, such as those formed by esterification reactions between a di-carboxylic acid, a glycol and an alcohol or a di-carboxylic acid.

The overbased detergent is generally added to the lubricating oil as a concentrate and we find that between 0.01% and 30% by weight, preferably between 0.1% and 5% by weight of a concentrate consisting of 60 wt % magnesium carbonate plus magnesium sulphurised-phenate and 40 wt % oil is particularly useful.

The final lubricating oil composition may if desired contain other additives, e.g. a Viscosity Index Improver such as an ethylene-propylene copolymer, an overbased calcium sulphonate or a dispersant such as poly-isobutylene succinimide.

The invention is illustrated by reference to the following Example.

EXAMPLE

The following well known procedure was used to prepare the overbased magnesium sulphurised phenates:

16.5 g of magnesium turnings were dissolved in varying amounts of ethoxyethanol to give solutions of magnesium ethoxyethoxide containing 5% to 9% and 10% of magnesium. To the solutions thus obtained were added:

(a) 9 g of a C-24 alkyl benzene sulphonic acid
(b) 131 g of a 75% nonyl phenol sulphide in oil having a hydroxyl number of 172 mg.KOH/g and containing 7.7% sulphur
(c) 90 g of a non-volatile diluent oil of viscosity 5 cS at 210° F.

To this mixture, stirred at 60° C., were added evenly over 30 mins. 16.5 g water mixed with 16.5 g ethoxyethanol. Carbon dioxide was then passed into the mixture until no more was absorbed (asorbtion was about 29 g/3 hrs). The temperature during carbonation was raised slowly from 60° to 100° C. The volatile components of the mixture were distilled off until the reactor temperature reached 150° C., when final traces were removed by $CO_2$ blowing at 250 mm Hg pressure. The product, about 290 g, was made up to 300 g by adding diluent oil, and was filtered using 1.5 g filter aid.

The total base numbers of products made by this process are 250 mg/KOH/g.

As shown in the table, in runs 1 to 3, the product viscosity decreased as the quantity of ethoxyethanol used to dissolve the magnesium decreased, i.e. the magnesium concentration in the alkoxyalkoxide increased.

It is impracticable to prepare magnesium ethoxyethoxide solutions of magnesium content above 10%, because the rate of solution decreases rapidly with concentration and for all practical purposes ceases at 10%. In Run 4 a further reduction of free ethoxyethanol present was accomplished by stripping the product in vacuo at 150° C. leaving only the 74 g ethoxyethanol combined with the excess magnesium as ethoxyethoxide.

The normal hydrolysis, carbonation, and stripping procedures were then applied and the product found to have a lower viscosity than the products of Runs 1-3.

| Run | % Mg in ethoxyethoxide soln. | Ethoxyethanol present before hydrolysis | | 210° F. Viscosity of phenate |
|-----|------------------------------|----------------------|------|----------------|
|     |                              | Combined | Free |                |
| 1   | 5                            | 122      | 193  | 343            |
| 2   | 9                            | 122      | 46   | 299            |
| 3   | 10                           | 122      | 28   | 240            |
| 4   | 9 but stripped before hydrolysis to 12% | 122 | 0 | 203 |

What we claim is:

1. A process comprising the following steps:
   (i) forming a reaction mixture comprising:
   (a) a non-volatile diluent oil
   (b) magnesium alkoxyalkoxide as a solution in the alkoxyalcohol from which it is derived
   (c) one or more hydrocarbyl-substituted phenols or metal phenates wherein the or each hydrocarbyl group contains no more than 60 carbon atoms or one or more sulphurised phenols having one or more hydrocarbyl group substituents each substituent containing no more than 60 carbon atoms or mixtures of said surfactants (ii) adjusting the concentration of the free alkoxyalcohol to be less than 5%

(iii) adding at least one mole of water for every gram atom of the magnesium present in excess of the amount of magnesium required to neutralise the surfactant and hydrolysing the magnesium alkoxyalkoxide (iv) introducing carbon dioxide into the reaction mixture whilst at a temperature not above 100° C.

(v) removing volatiles from the reaction mixture.

2. A process according to claim 1 in which the surfactant is a nonyl phenol sulphide oil mixture containing from 5.5 to 7.5 wt % of sulphur.

3. A process according to claim 1 in which sulphonate or a sulphonic acid is included in the reaction mixture.

4. A process according to claim 3 in which the sulphonic acid is a $C_{18}$ to $C_{30}$ benzene sulphonic acid.

5. A process according to any of the preceding claims in which the reaction mixture is heated to a temperature in the range 50° C. to 70° C. when the water is added.

6. A process according to any of the preceding claims in which the temperature of the mixture is held below 100° C. during carbonation.

7. A basic magnesium phenate whenever made by a process according to anyone of the preceding claims.

* * * * *